UNITED STATES PATENT OFFICE 2,237,131

TREATMENT OF WELLS

Richard H. Carr, Chicago, Ill., assignor to The Pure Oil Company, Chicago, Ill., a corporation of Ohio No Drawing. Application December 9, 1938,
Serial No. 244,759

4 Claims. (Cl. 255—1)

The invention relates to methods of obtaining a mineral fluid such as oil, gas, water, or brine from subterranean strata penetrated by a well bore. It more particularly concerns an improved method of bringing about a facilitated flow of mineral fluid from each of two or more subterranean strata into a common well bore drilled thereinto.

In drilling for mineral fluids, and more particularly for oil or gas, it oftentimes happens that the drill penetrates a plurality of productive strata. Such strata may be of widely varying permeability, which do not deliver fluid to the well bore with equal facility. Heretofore it has been attempted to acidize such wells, when the formations are acid-soluble, with the object of increasing the permeability of the producing strata including the less permeable zones, whereby the total flow into the bore would be increased. However, such attempts have not always been effective, because the acid ordinarily enters the more porous of the producing zones and spends itself therein, while the relatively tight zones are not substantially attacked by the acid. This is evidently due to the fact that the resistance to penetration by the acid in the relatively tight zones is much higher. Accordingly, the permeability of the relatively tight producing zones is not substantially increased, even though these zones may be and often are capable of greatly increased production if rendered sufficiently permeable by action of the acid.

The conventional methods of directing acid into a selected stratum do not fully meet the exigencies of the present situation, because the more permeable producing strata are not always in such a position with respect to the tighter strata as to permit their being blanketed off in conventional manner, as by introducing a quantity of a heavy liquid or a solution of an organic jellifying material into the bottom of the well bore. This is the case, for example, when the relatively porous pay zones overlie the tighter pay zones. Again, if the less permeable zone happens to overlie the more permeable zones, so that the latter can be blanketed off in conventional manner, the difficulty at once arises as to how much blanketing medium to employ to properly cover the permeable zones, while leaving the less permeable zone fully exposed for attack by the acid. No method is available by which the proper volume of blanket solution can be readily determined with accuracy. Thus, there is no fully effective method for bringing about a facilitated flow of mineral fluid into a well bore penetrating a plurality of producing zones of varying permeability.

It is, therefore, one of the objects of the invention to provide a method of facilitating the flow of mineral fluid from a plurality of productive strata into a common well bore drilled thereinto. Other objects and advantages will become apparent as the description of the invention proceeds.

The invention is carried out in connection with the drilling of the well, which is commenced in conventional manner with the usual rotary tools employing a drilling fluid circulation for carrying the drill cuttings to the surface. However, instead of completing the boring through all the strata before treatment with acid, as in the usual practice, I acidize each productive zone, the permeability of which it is desired to increase, as it is reached by the drill. The hollow drill stem is utilized for delivering the acid to the zone to be treated, and the hydrostatic head of the drilling fluid standing in the bore to direct the acid into the surrounding earth. After each acid treatment, drilling is resumed without withdrawing the spent acid until the well has been drilled to the desired depth. Thereafter the well is cleaned, completed, and put into production.

By employing the foregoing improved method, positive assurance is had that the permeability of each producing zone is adequately increased, so that greatly improved results are obtained as regards increased production.

In carrying out the method of the invention on a location wherein the drilling operation is being conducted with rotary tools, the drilling of the well bore is continued until the drill bit penetrates and preferably just passes through a producing zone. When a producing zone has thus been reached by the drill, the drilling operation is halted and a quantity of acid solution is introduced into the well bore through the drill stem, while a corresponding volume of the drilling fluid employed in the drilling operation and which occupies the drill stem is allowed to escape at the casing head. When a volume of acid sufficient in amount to fill the drill stem and preferably displace the drilling fluid upward in the well bore exposing the producing stratum has been introduced into the well, the casing head is closed in and pressure is applied on the acid by pumping more acid into the drill stem or by pumping additional liquid such as drilling fluid into the drill stem, if the desired quantity of acid has been introduced. After the acid is displaced from the well bore into the surrounding formation, the drilling operation is resumed until a subsequent producing zone is reached requiring acidizing. This zone is then similarly acidized in the above described manner. The steps of drilling and acidizing, as described, are repeated, if necessary, as pay zones are reached, the permeability of which is to be increased until the well bore has been drilled to the desired depth. After the drilling of the well bore has been completed to the desired depth, the drilling fluid may be withdrawn from the well and the acidized strata purged of spent acid, as by bailing.

Various modifications of the above method may be satisfactorily employed. For example, in some instances it may be desirable to displace or wash off the lining formed by the drilling fluid from the walls of the section or zone to be acidized, as by operating the drill in the presence of a quantity of water introduced into the well ahead of the acid charge, so that it can be more readily forced into the formation. Usually from 50 to 300 gallons or more of water is sufficient for this purpose. In addition, the water serves to separate the mud from the acid so that the two solutions do not become contaminated with each other in the well bore.

Among the acids suitable to employ are those capable of dissolving calcareous rock and forming water-soluble salts therewith, such as hydrochloric, nitric, or mixtures thereof. It is generally desirable to include in the acid solution an inhibitor of the action of the acid on metals to protect the metal parts of the equipment contacted by the acid. A generally suitable amount of acid to employ may be between about 200 to 700 gallons per foot of the producing zone being treated. The concentration of the acid solution may be varied considerably. For example, when employing hydrochloric acid, a concentration of from 5 to 25 per cent, and preferably about 15 per cent, gives the most satisfactory results.

Some of the advantages of the invention are that positive assurance is had that all the acid-soluble producing strata penetrated by the drill can be treated to increase their permeability, and that any desired degree of permeability of each separate stratum can be obtained, as the quantity of acid directed into each stratum is subject to control.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of facilitating the flow of mineral fluid from a plurality of strata into a well bore being drilled thereinto employing conventional rotary tools and a drilling mud fluid circulation through the drill stem to carry the drill cuttings to the surface, the steps which consist in halting the drilling operation when the drill has passed entirely through a producing formation, introducing a quantity of acid into the well bore through the drill stem while allowing drilling mud fluid to escape at the casing head until the drilling mud in the drill stem is displaced, closing in the casing head so as to prevent further escape of the drilling mud fluid therefrom, applying pressure upon the acid whereby said acid is displaced into the producing stratum, and thereafter resuming the drilling operation employing a drilling mud fluid circulation through the drill stem until a subsequent producing stratum has been drilled through and repeating the foregoing steps of introducing acid into the well bore through the drill stem so as to displace said acid only into the subsequent producing stratum.

2. In a method of facilitating the flow of mineral fluid from a plurality of strata into a well bore being drilled thereinto employing conventional rotary tools and a drilling mud fluid circulation through the drill stem to carry the drill cuttings to the surface, the steps which consist in halting the drilling operation after a producing stratum has been drilled completely through, introducing a quantity of aqueous hydrochloric acid inhibited against attack upon iron or steel into the well through the drill stem in an amount sufficient to fill the drill stem and displace the drilling mud fluid upward into the well bore and expose the producing stratum while allowing drilling mud fluid to escape at the casing head, closing in the casing head so as to prevent further escape of drilling mud fluid therefrom, applying pressure upon the acid whereby said acid is displaced into the producing stratum, and thereafter resuming the drilling operation while circulating drilling mud fluid through the drill stem until a second producing stratum has been drilled through, and repeating the foregoing steps of introducing a quantity of acid into the well bore so as to displace said acid only into the second producing stratum.

3. In a method of facilitating the flow of mineral fluid from a plurality of strata into a well bore being drilled thereinto employing conventional rotary tools and a drilling mud fluid circulation through the drill stem to carry the drill cuttings to the surface, the steps which consist in drilling entirely through a producing stratum, introducing a quantity of water into the well bore through the drill stem and following the water with a quantity of hydrochloric acid while allowing drilling mud fluid to escape at the casing head until the drilling mud fluid is displaced upwardly into the well bore exposing the producing stratum to the water, closing in the casing head and operating the drill in the presence of the water, whereby the mud sheath formed on the walls of the well bore by the drilling mud fluid is removed from the walls of the producing stratum, allowing additional mud fluid to escape at the casing head until the producing stratum is exposed to the acid, halting the operation of the drill, closing in the casing head so as to prevent further escape of the drilling mud fluid therefrom, applying pressure upon the acid whereby said acid is displaced into the producing stratum, resuming the drilling operation without withdrawing the spent acid while circulating drilling mud fluid through the drill stem until a second producing stratum is drilled through, and thereafter introducing water and acid into the well bore through the drill stem so as to force the acid only into the second producing stratum drilled through.

4. In a method of facilitating the flow of mineral fluid from a plurality of producing zones into a well bore being drilled thereinto employing conventional rotary tools and a drilling mud fluid circulation through the drill stem to carry the drill cuttings to the surface, the steps which consist in halting the drilling operation after drilling through each productive zone, the permeability of which it is desired to increase, introducing a quantity of acid into the well bore sufficient to displace the drilling mud fluid from the drill stem and upwardly in the well bore a sufficient distance to expose to the acid the producing zone which it is desired to acid treat, while allowing drilling mud fluid to escape at the casing head, closing the casing head when the producing zone is exposed in order to prevent further escape of drilling mud fluid, forcing the acid under pressure from the drilling stem into the producing zone and resuming drilling after acid treatment of each zone without withdrawing spent acid until the well has been drilled to the desired depth.

RICHARD H. CARR.